US011997241B2

(12) United States Patent
Nakao et al.

(10) Patent No.: US 11,997,241 B2
(45) Date of Patent: May 28, 2024

(54) OPTICAL SCANNING DEVICE AND IMAGE FORMING APPARATUS INCLUDING OPTICAL SCANNING DEVICE

(71) Applicant: SHARP KABUSHIKI KAISHA, Sakai (JP)

(72) Inventors: Atsuo Nakao, Sakai (JP); Hiroshi Yamamoto, Sakai (JP); Hidenori Sato, Sakai (JP); Hiroaki Goi, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 115 days.

(21) Appl. No.: 17/720,052

(22) Filed: Apr. 13, 2022

(65) Prior Publication Data

US 2022/0385782 A1    Dec. 1, 2022

(30) Foreign Application Priority Data

May 27, 2021   (JP) ................................. 2021-089332

(51) Int. Cl.
*G03G 15/04* (2006.01)
*G03G 21/16* (2006.01)
*H04N 1/10* (2006.01)

(52) U.S. Cl.
CPC ..... *H04N 1/1065* (2013.01); *G03G 15/04045* (2013.01); *G03G 21/1666* (2013.01); *H04N 1/1048* (2013.01)

(58) Field of Classification Search
CPC ............... H04N 1/1065; H04N 1/1048; G03G 15/04045; G03G 21/1666
See application file for complete search history.

(56) References Cited

U.S. PATENT DOCUMENTS

| 2003/0226958 | A1  | 12/2003 | Ohno et al. |
| 2006/0232844 | A1* | 10/2006 | Nakajima ............ G02B 26/123 359/198.1 |
| 2019/0215414 | A1  | 7/2019  | Matsuo et al. |

FOREIGN PATENT DOCUMENTS

| JP | 2004-012859 A | 1/2004 |
| JP | 2019-120796 A | 7/2019 |

* cited by examiner

*Primary Examiner* — Walter L Lindsay, Jr.
*Assistant Examiner* — Geoffrey T Evans
(74) *Attorney, Agent, or Firm* — ScienBiziP, P.C.

(57) ABSTRACT

An optical scanning device includes a housing and an fθ lens accommodated in the housing. The housing has a bottom surface, and side walls erected from a bottom surface and surrounding the bottom surface along a perimeter thereof. One side wall of the side walls has, on an outer surface thereof, one or more positioners that position the optical scanning device relative to an image forming apparatus main body. The bottom surface has one or more first bottom surface ribs extending from the positioners toward the fθ lens in an oblique direction with respect to the side wall having the positioners in a plan view.

17 Claims, 15 Drawing Sheets

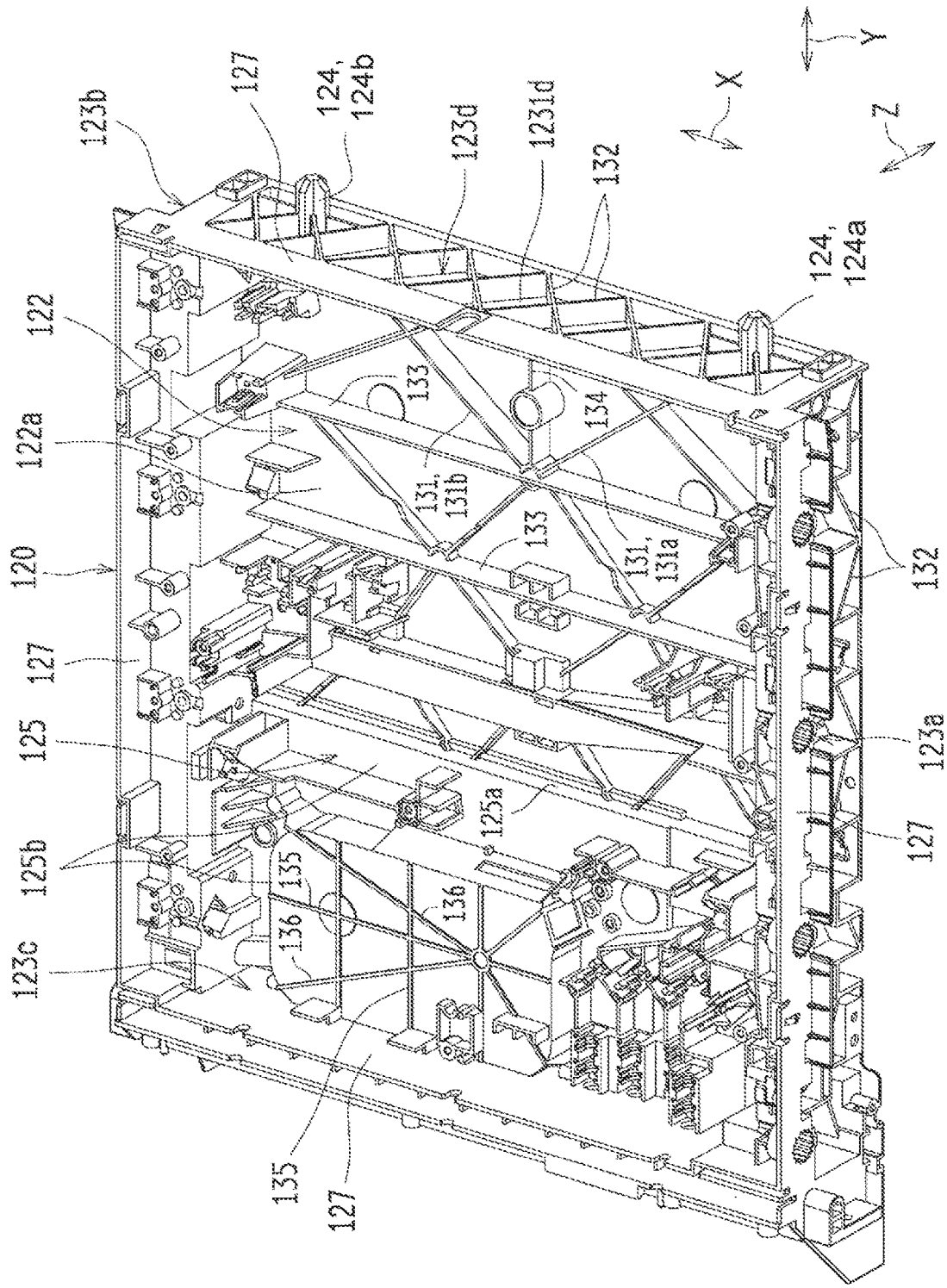

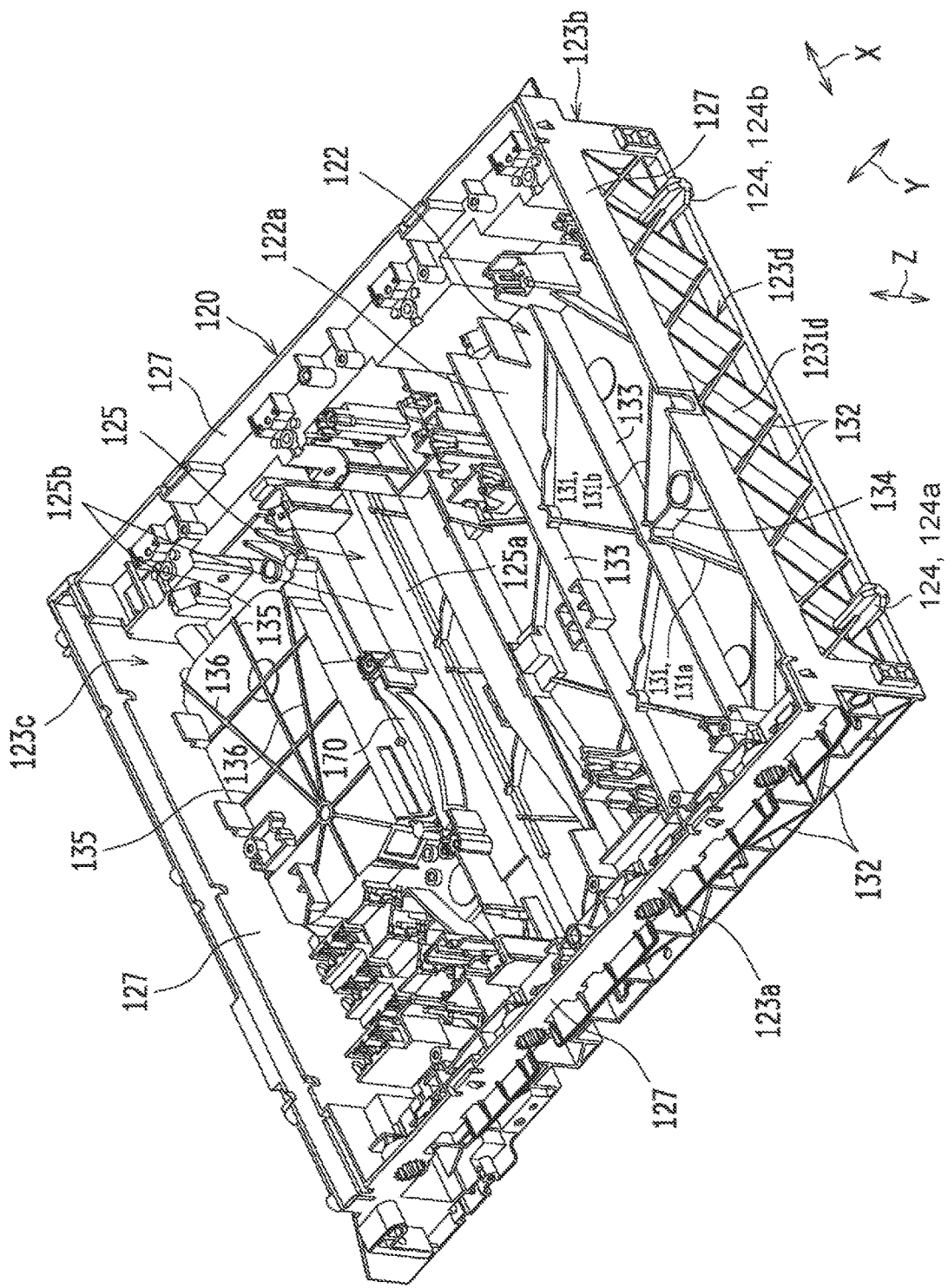

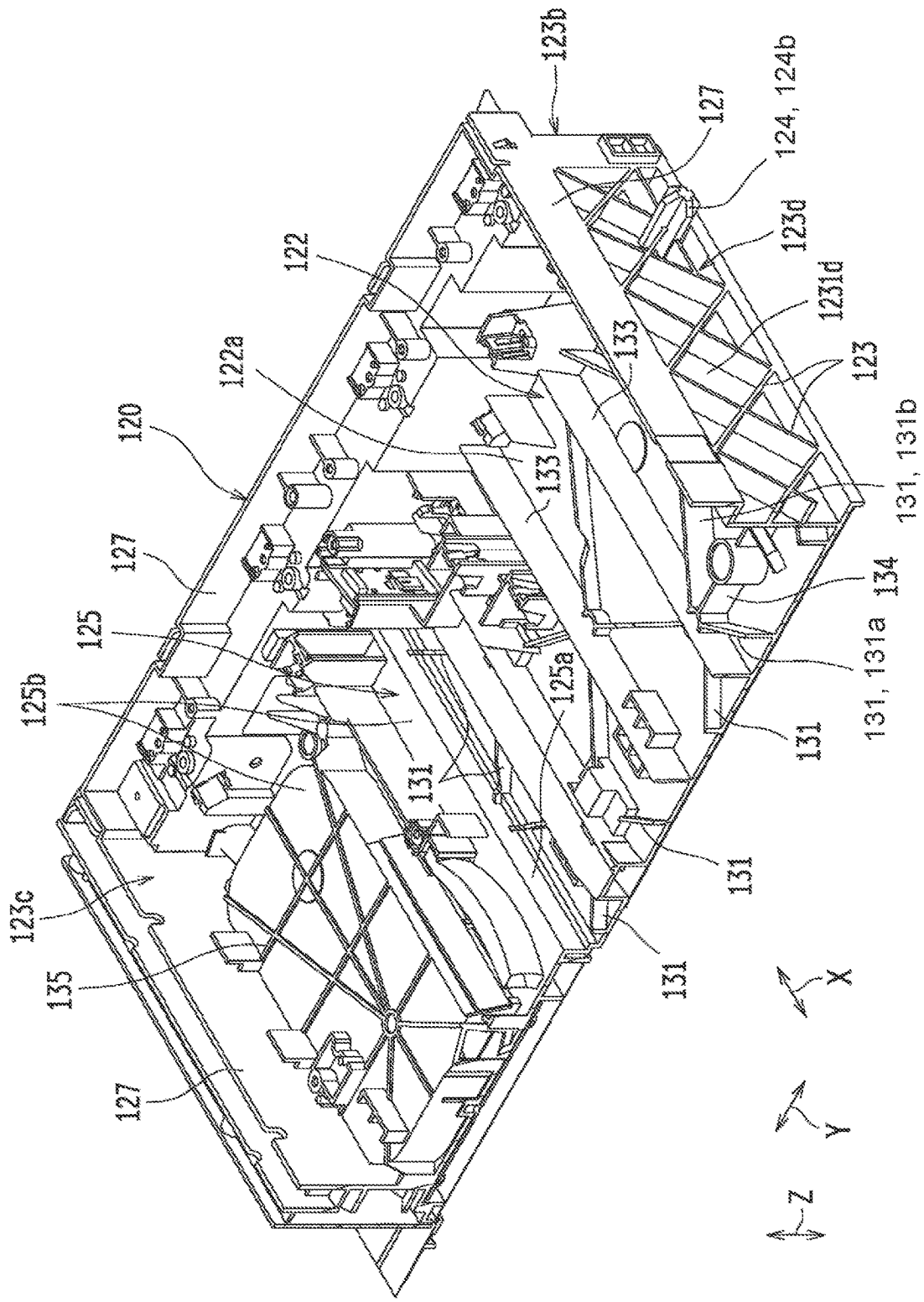

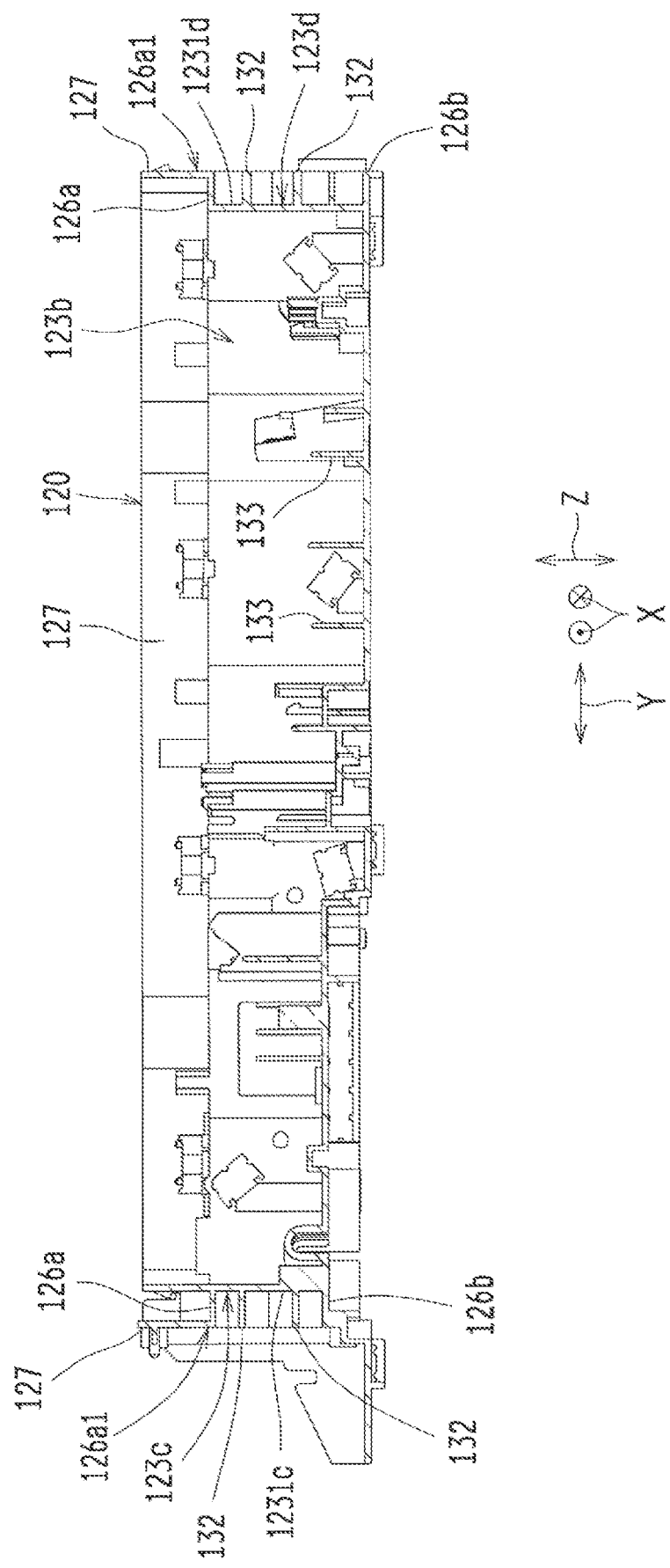

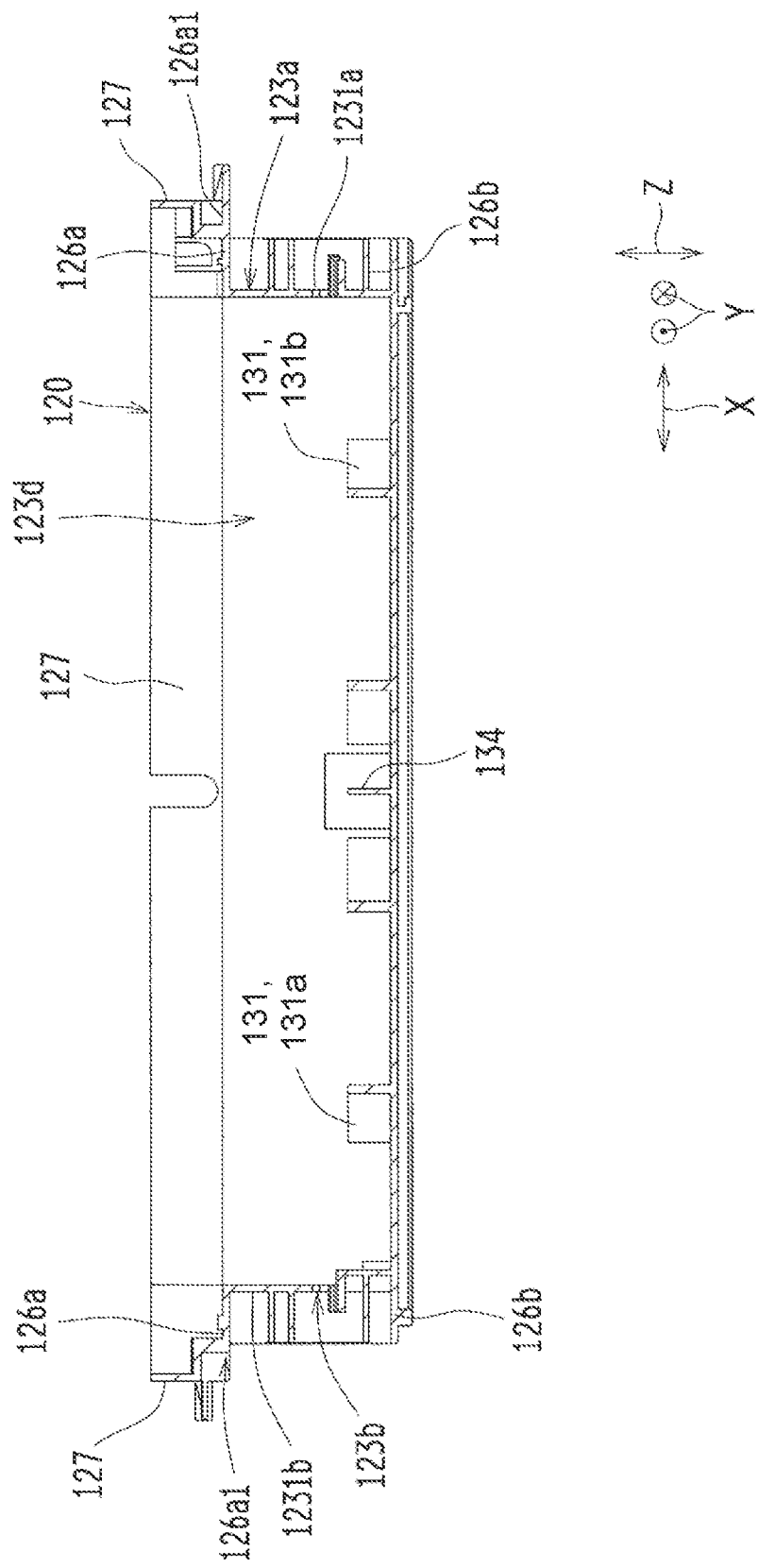

OPTICAL SCANNING DEVICE AND IMAGE FORMING APPARATUS INCLUDING OPTICAL SCANNING DEVICE

BACKGROUND OF THE INVENTION

Field of the Invention

The present invention relates to an optical scanning device and an image forming apparatus including the optical scanning device, such as a copier, a multifunction peripheral, a printer, or a facsimile machine.

Description of the Background Art

A known conventional optical scanning device includes: a box-shaped housing having a bottom surface and side walls erected from the bottom surface and surrounding the bottom surface along a perimeter thereof; and an fθ lens accommodated in the housing (see, for example, Japanese Unexamined Patent Application Publication No. 2004-12859).

A possible way to reduce the cost of a housing (for example, housing made from a resin material) of such an optical scanning device is by reducing a basic thickness (for example, amount of resin) of the housing. In this case, the housing has a reduced strength and is therefore easily deformed, resulting in a decrease in the accuracy of optical components including the fθ lens. It is therefore desirable to maintain the strength of the housing.

However, simply forming a large number of ribs on the bottom surface of the housing to compensate for the reduced basic thickness as in the optical scanning device disclosed in Japanese Unexamined Patent Application Publication No. 2004-12859 results in the need for a material for forming the large number of ribs and unwanted costs. Furthermore, this solution is not enough to prevent the decrease in the strength of the housing or the resulting decrease in the accuracy of the optical components including the fθ lens.

An objective of the present invention is therefore to provide an optical scanning device that makes it possible to effectively prevent a decrease in the strength of a housing thereof and a resulting decrease in the accuracy of optical components therein including an fθ lens even if the basic thickness of the housing is reduced. Another objective of the present invention is to provide an image forming apparatus including the optical scanning device.

SUMMARY OF THE INVENTION

In order to achieve the aforementioned objectives, the inventors conducted intensive studies, and thus found the following. In an optical scanning device including: a housing having a bottom surface, and side walls erected from the bottom surface and surrounding the bottom surface along a perimeter thereof; and an fθ lens accommodated in the housing, it is possible to effectively prevent a decrease in the strength of the housing and a resulting decrease in the accuracy of optical components including the fθ lens through a configuration in which one side wall of the side walls has, on an outer surface thereof, one or more positioners that position the optical scanning device relative to a main body of an image forming apparatus, and the bottom surface has one or more ribs extending from the positioners toward the fθ lens in an oblique direction with respect to the side wall having the positioners in a plan view.

Note that in an optical scanning device disclosed in Japanese Unexamined Patent Application Publication No. 2019-120796, a side wall has, on an outer surface thereof, a positioner that positions the optical scanning device relative to a main body of an image forming apparatus, but the bottom surface has no ribs.

Based on the above-described findings, the present invention provides an optical scanning device including: a housing having a bottom surface, and side walls erected from the bottom surface and surrounding the bottom surface along a perimeter thereof; and an fθ lens accommodated in the housing, wherein one side wall of the side walls has, on an outer surface thereof, one or more positioners that position the optical scanning device relative to a main body of an image forming apparatus, and the bottom surface has one or more first bottom surface ribs extending from the positioners toward the fθ lens in an oblique direction with respect to the side wall having the positioners in a plan view.

According to the present invention, it is possible to effectively prevent a decrease in the strength of the housing and a resulting decrease in the accuracy of optical components including the fθ lens even if the basic thickness of the housing is reduced.

BRIEF DESCRIPTION OF THE DRAWINGS

FIG. 6A is an isometric view of the housing of the optical scanning device.

FIG. 6B is an isometric view of the housing of the optical scanning device with an fθ lens provided therein.

FIG. 6C is an isometric view of cross sections of the housing and the fθ lens shown in FIG. 6B.

FIG. 7A is a cross-sectional view along line B-B shown in FIG. 5.

FIG. 7B is a cross-sectional view along line C-C shown in FIG. 5.

DESCRIPTION OF THE PREFERRED EMBODIMENTS

The following describes embodiments of the present invention with reference to the accompanying drawings. The same components in the following description are labeled with the same reference signs. The same components have the same name and the same function. Therefore, detailed description thereof will not be repeated.

Image Forming Apparatus

Figure 1:
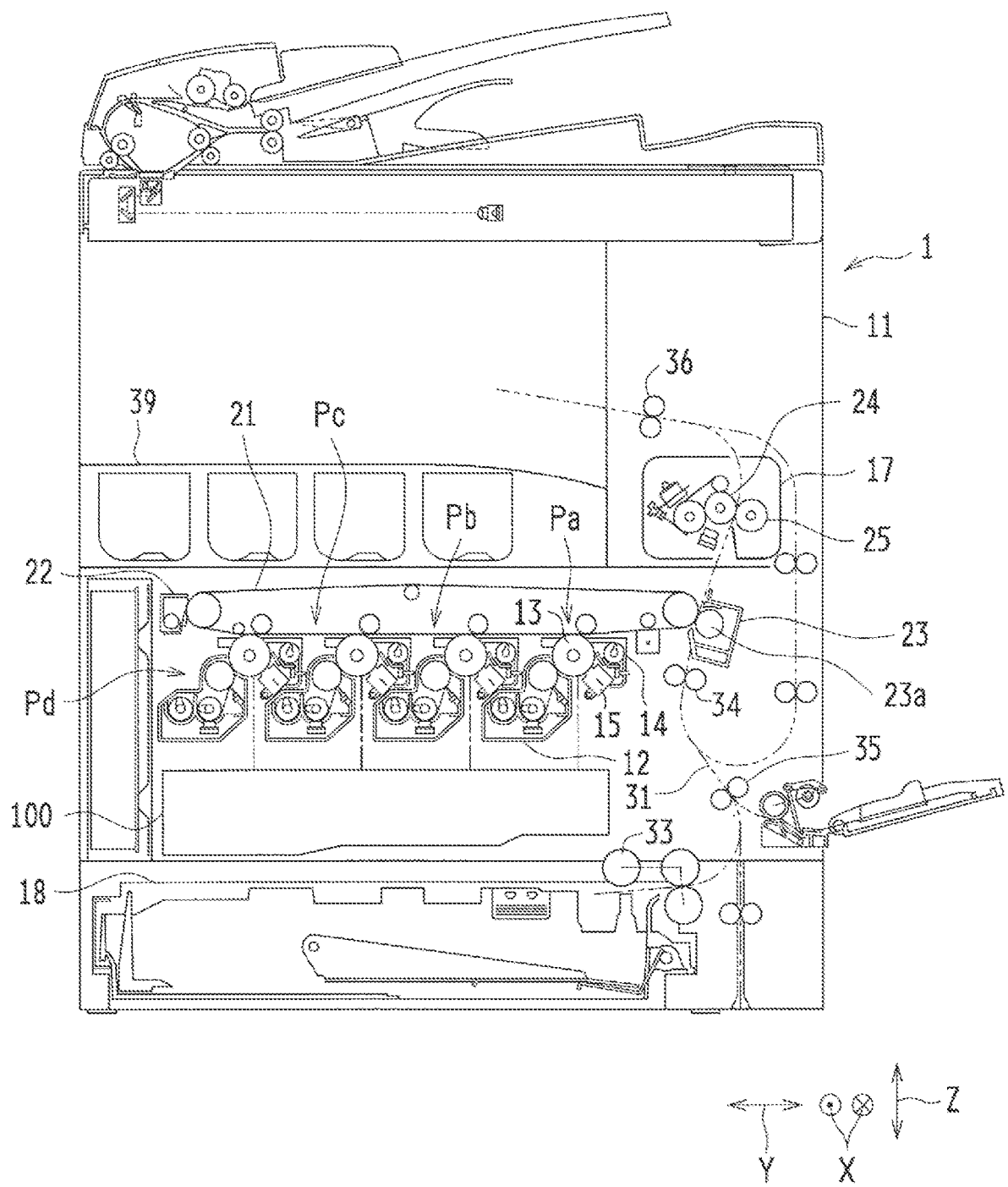
FIG. 1 is a cross-sectional view of an image forming apparatus including an optical scanning device according to an embodiment of the present invention.

FIG. 1 is a cross-sectional view of an image forming apparatus 1 including an optical scanning device 100 according to an embodiment of the present invention. The following description is based on the drawings in which a direction perpendicular to a main scanning direction X is a width direction Y (sub-scanning direction), and a direction perpendicular to the main scanning direction X and the width direction Y is an up-down direction Z.

Image data that is handled in an image forming apparatus main body 11 of the image forming apparatus 1 is based on a color image in which black (K), cyan (C), magenta (M), and yellow (Y) colors are used or a monochrome image in which a single color (for example, black) is used. Accordingly, four developing devices 12, four photoreceptor drums 13, four drum cleaners 14, and four chargers 15 are provided to form four toner images in the respective colors, constituting four image stations Pa, Pb, Pc, and Pd respectively corresponding to black, cyan, magenta, and yellow.

In the image stations Pa, Pb, Pc, and Pd, each of the drum cleaners 14-14 removes and collects residual toner from a surface of a corresponding one of the photoreceptor drums 13-13, and then each of the chargers 15-15 uniformly charges the surface of a corresponding one of the photoreceptor drums 13-13 to a predetermined potential. The optical scanning device 100 exposes the surfaces of the photoreceptor drums 13-13 to light to form electrostatic latent images on the surfaces of the respective photoreceptor drums 13-13. Each of the developing devices 12-12 develops the electrostatic latent image on the surface of a corresponding one of the photoreceptor drums 13-13 to form a toner image on the surface of the corresponding one of the photoreceptor drums 13-13. Through the above, a toner image in the corresponding color is formed on the surface of each of the photoreceptor drums 13-13.

Subsequently, a belt cleaner 22 removes and collects residual toner from an intermediate transfer belt 21 in rotational movement, and then the toner images in the respective colors are sequentially transferred from the surfaces of the respective photoreceptor drums 13-13 to the intermediate transfer belt 21 and superimposed on one another to form a color toner image on the intermediate transfer belt 21.

A nip area is formed between the intermediate transfer belt 21 and a transfer roller 23a of a secondary transfer device 23. While recording paper conveyed through a paper conveyance path 31 is nipped and further conveyed in the nip area, the color toner image on the surface of the intermediate transfer belt 21 is transferred onto the recording paper. Subsequently, heat and pressure are applied to the recording paper passing between a heating roller 24 and a pressure roller 25 of a fixing device 17 to fix the color toner image on the recording paper.

The recording paper is pulled out of a paper feed cassette 18 by a pickup roller 33, conveyed through the paper conveyance path 31, and discharged onto a paper discharge tray 39 through paper discharge rollers 36 after passing through the secondary transfer device 23 and the fixing device 17. Rollers such as registration rollers 34 and conveyance rollers 35 are disposed along the paper conveyance path 31. The registration rollers 34 temporarily stop the recording paper, align the leading edge of the recording paper, and then start conveyance of the recording paper in time for the transfer of the toner image in the nip area between the intermediate transfer belt 21 and the transfer roller 23a. The conveyance rollers 35 facilitate the conveyance of the recording paper.

Optical Scanning Device

The following describes an example of the optical scanning device 100 according to the present embodiment included in the image forming apparatus 1.

Figure 2:
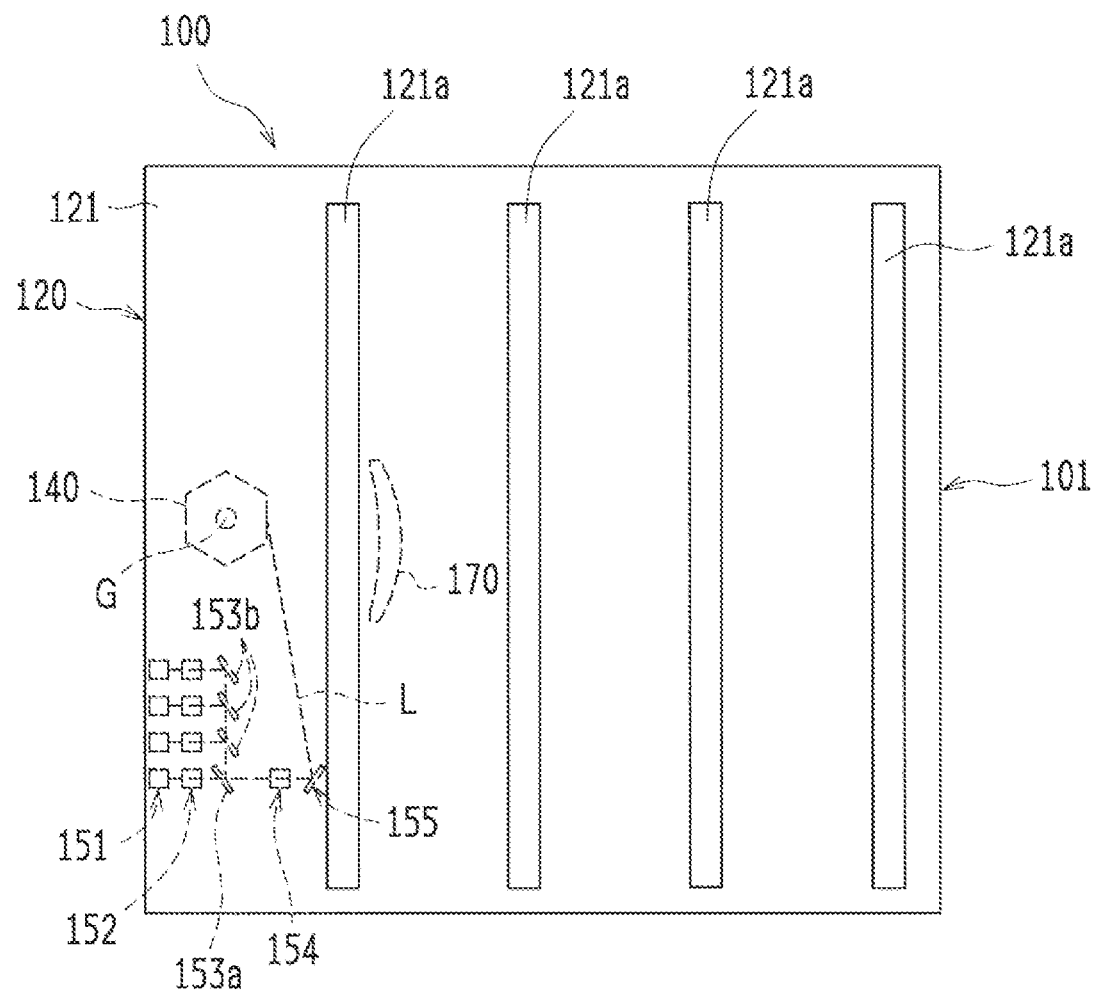
FIG. 2 is a schematic plan view of the optical scanning device according to the embodiment.
Figure 3:
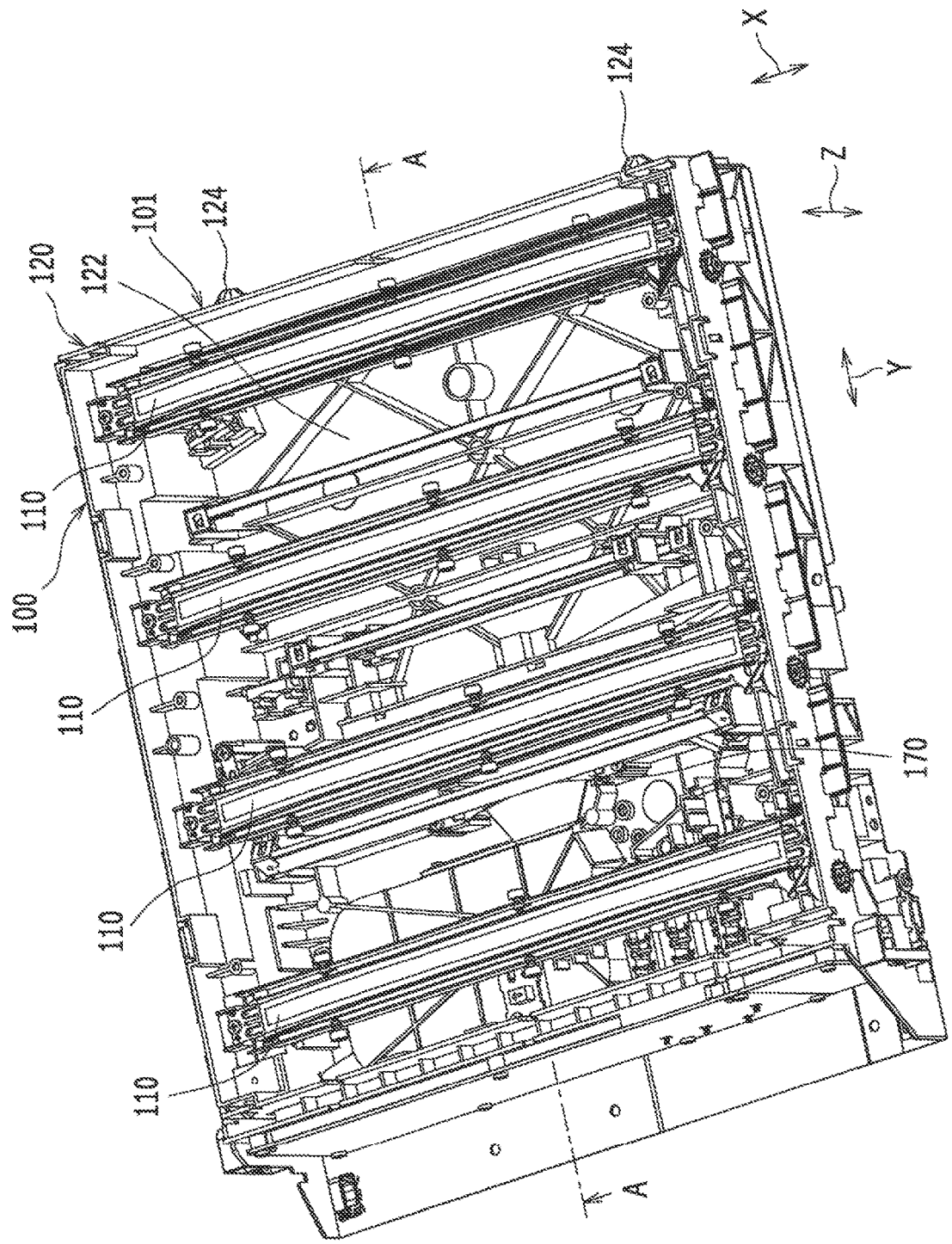
FIG. 3 is a top front isometric view of the optical scanning device with a top cover thereof removed.
Figure 4:
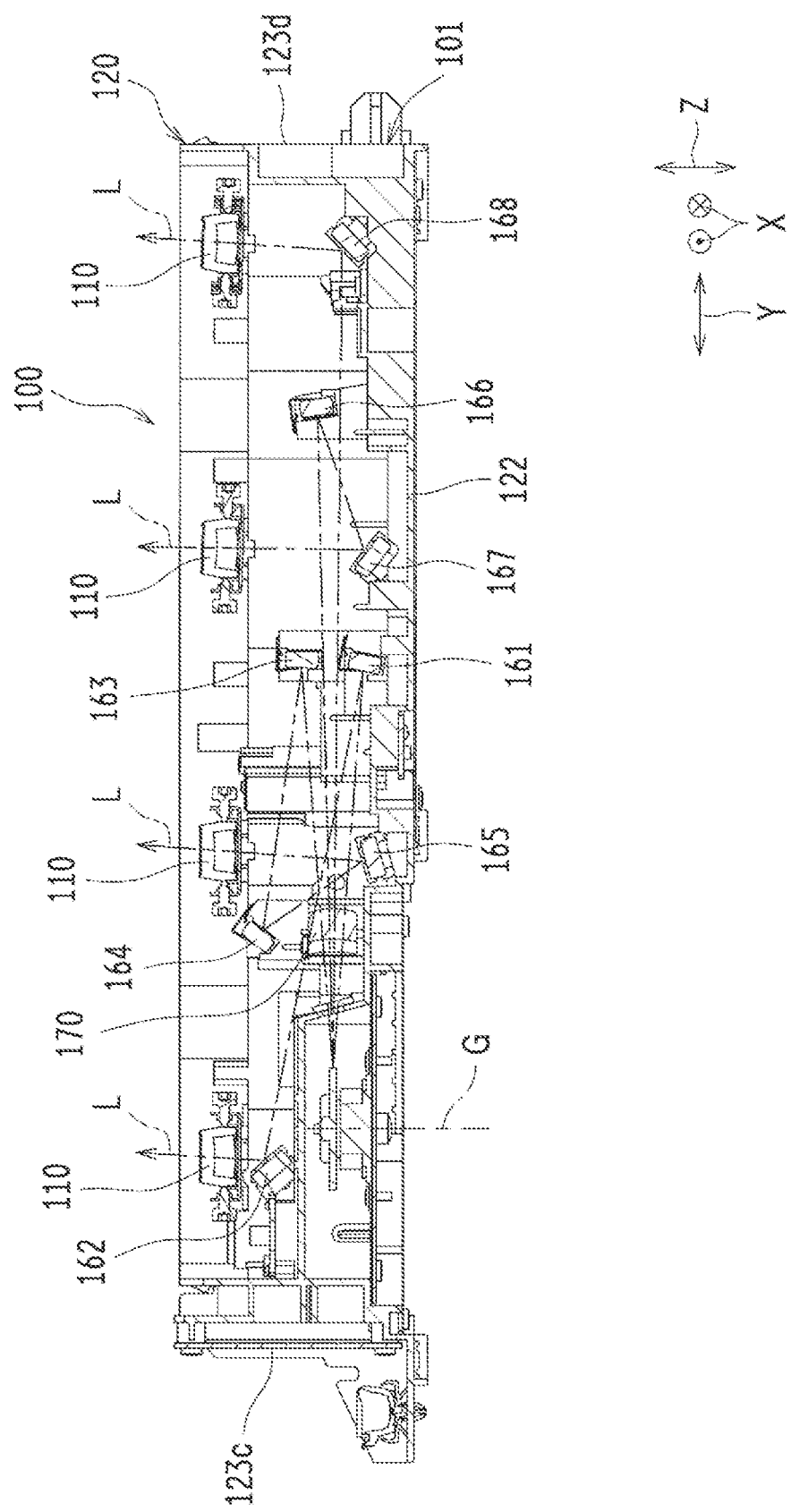
FIG. 4 is a cross-sectional view of the optical scanning device along line A-A shown in FIG. 3.
Figure 5:
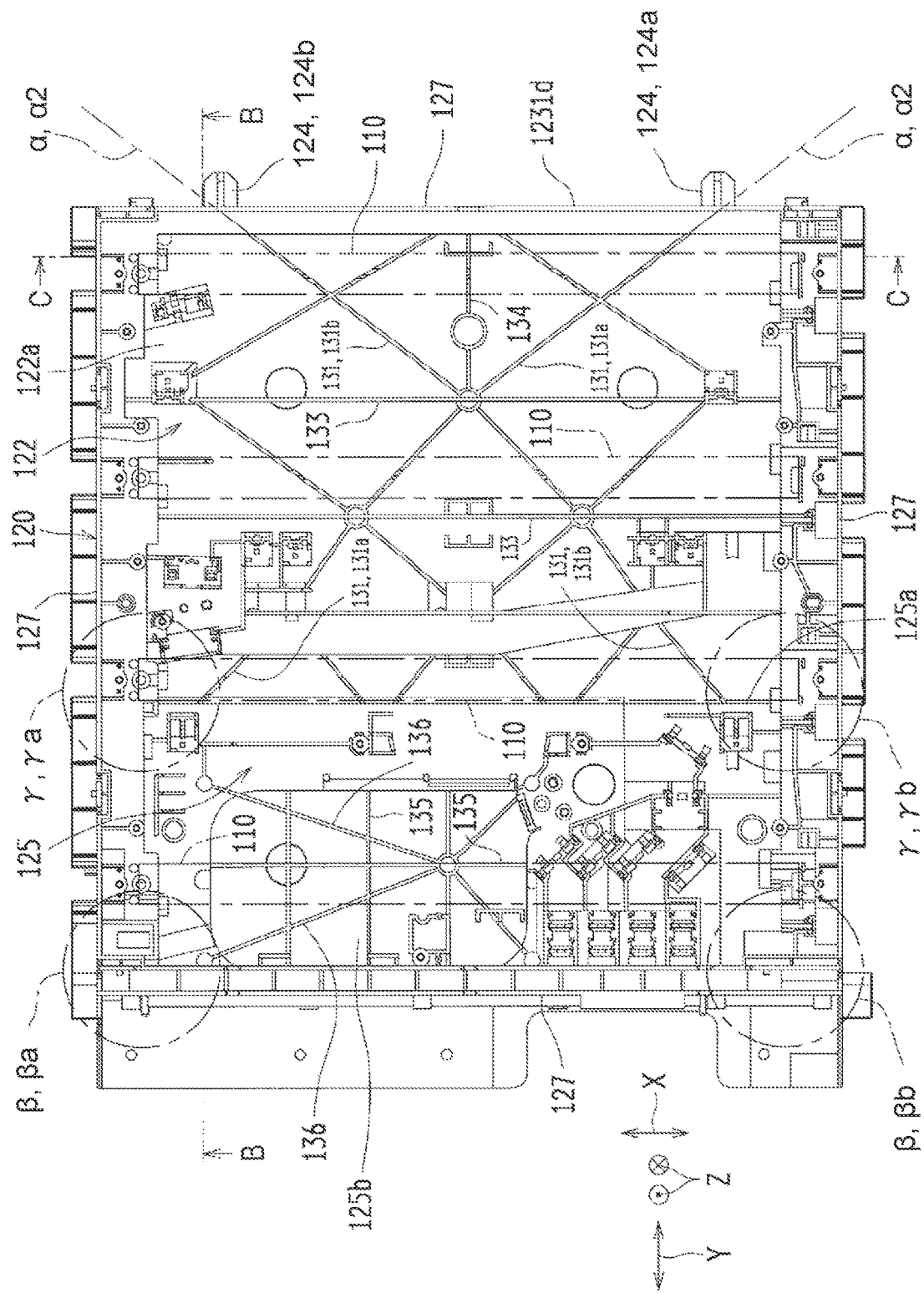
FIG. 5 is a plan view of a housing of the optical scanning device.
Figure 6D:
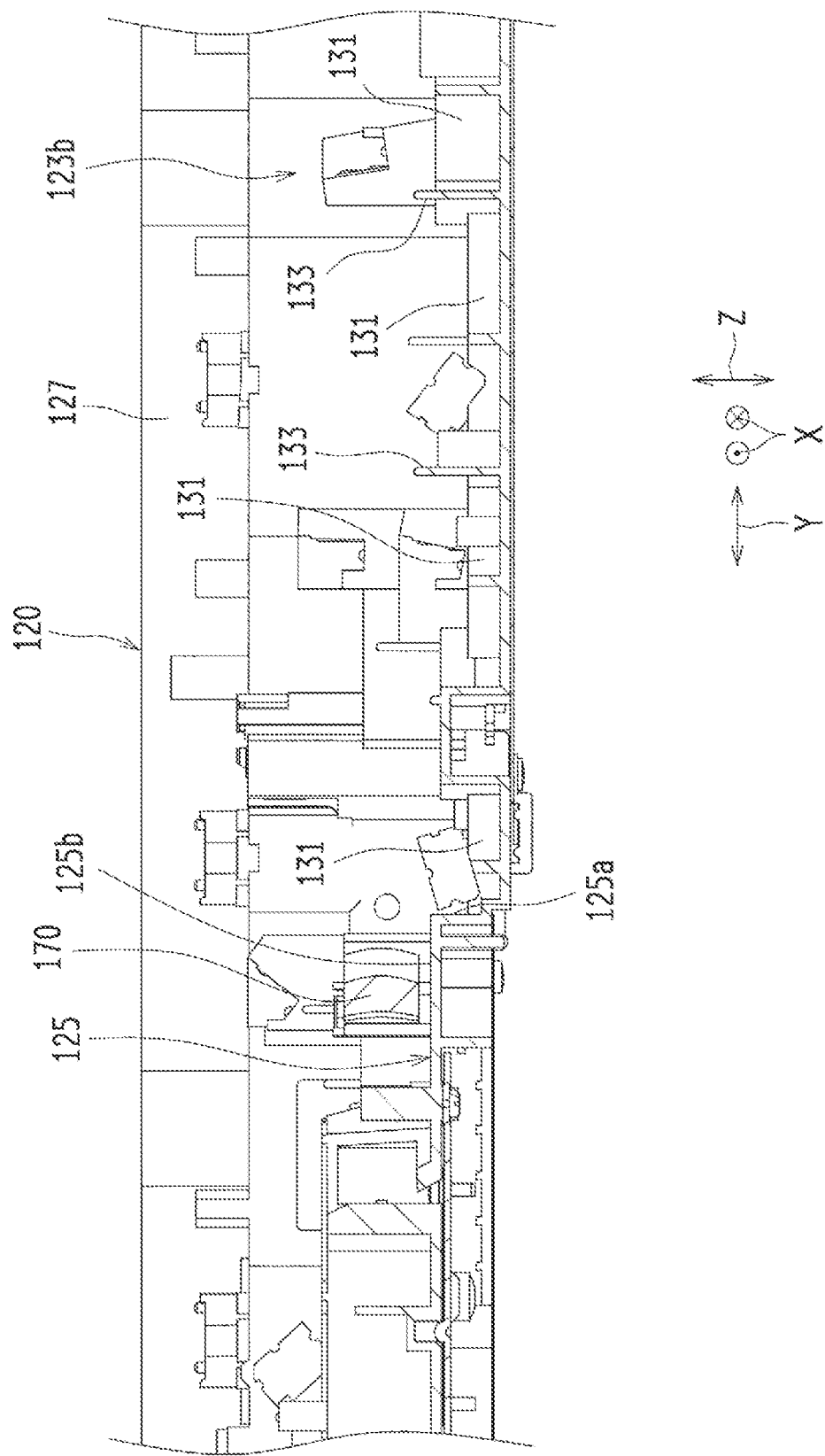
FIG. 6D is a cross-sectional view of a portion of the cross sections shown in FIG. 6C.
Figure 8A:
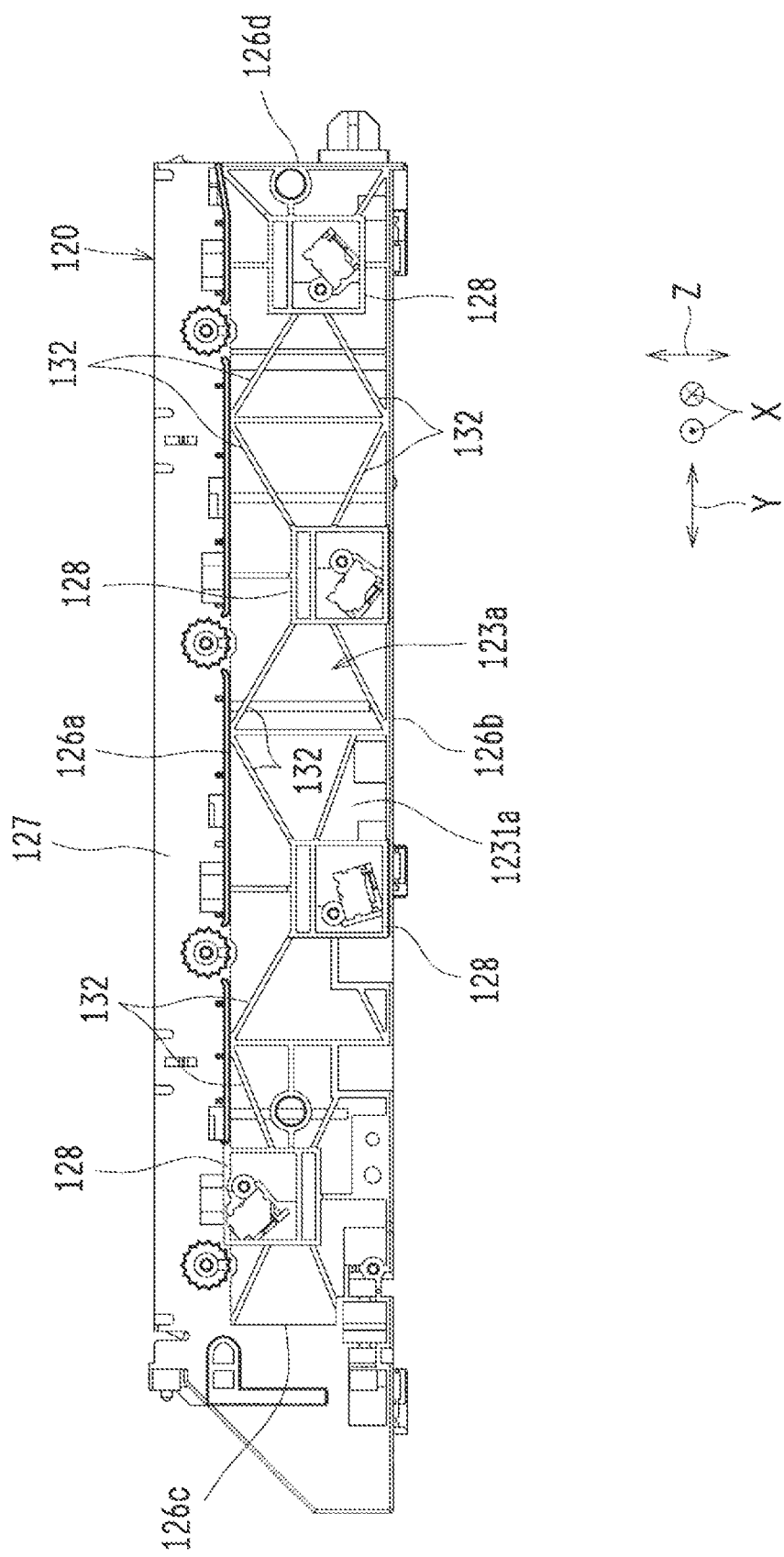
FIG. 8A is a front view of the housing of the optical scanning device.
Figure 8B:
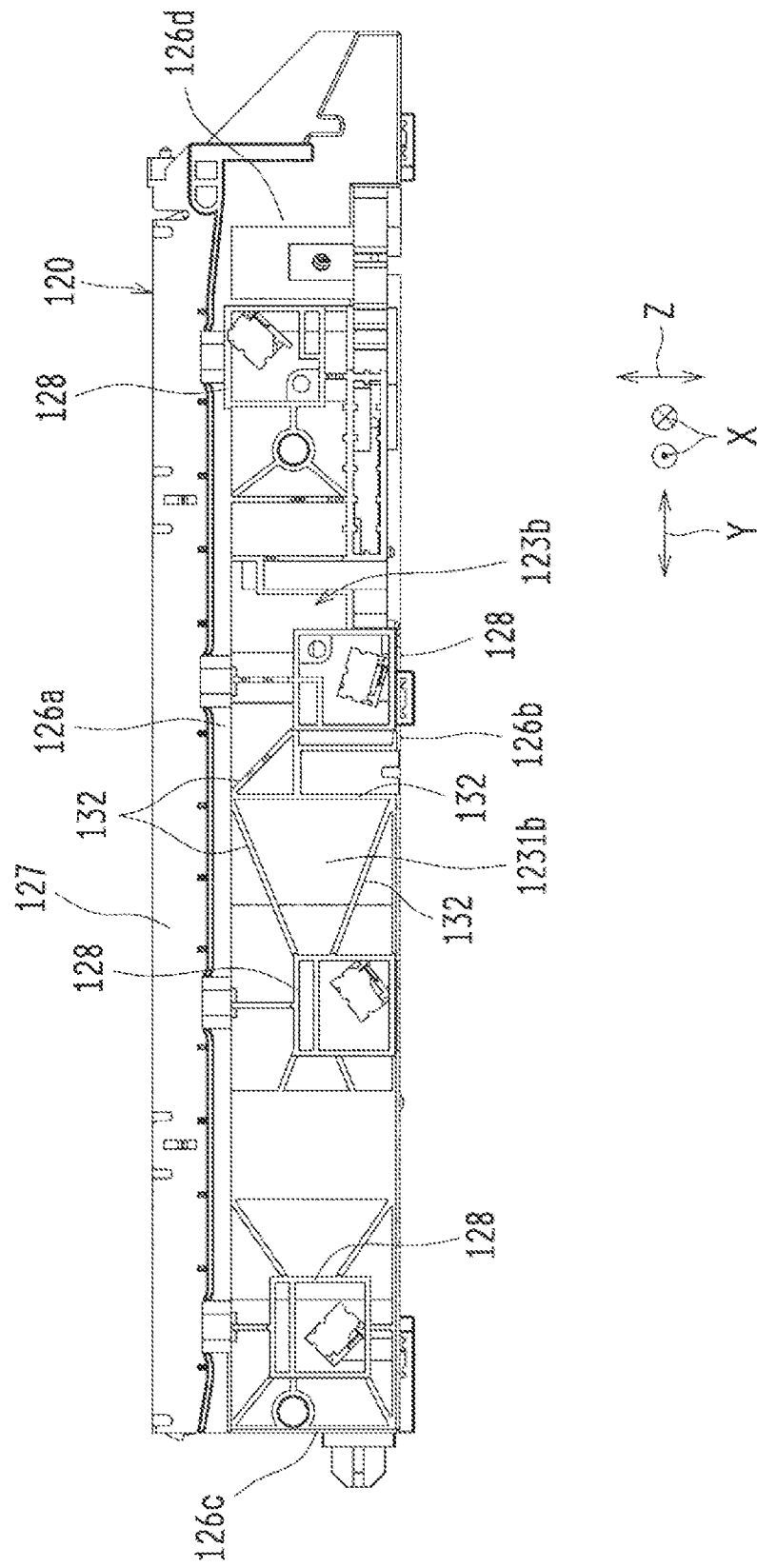
FIG. 8B is a back view of the housing of the optical scanning device.
Figure 8C:
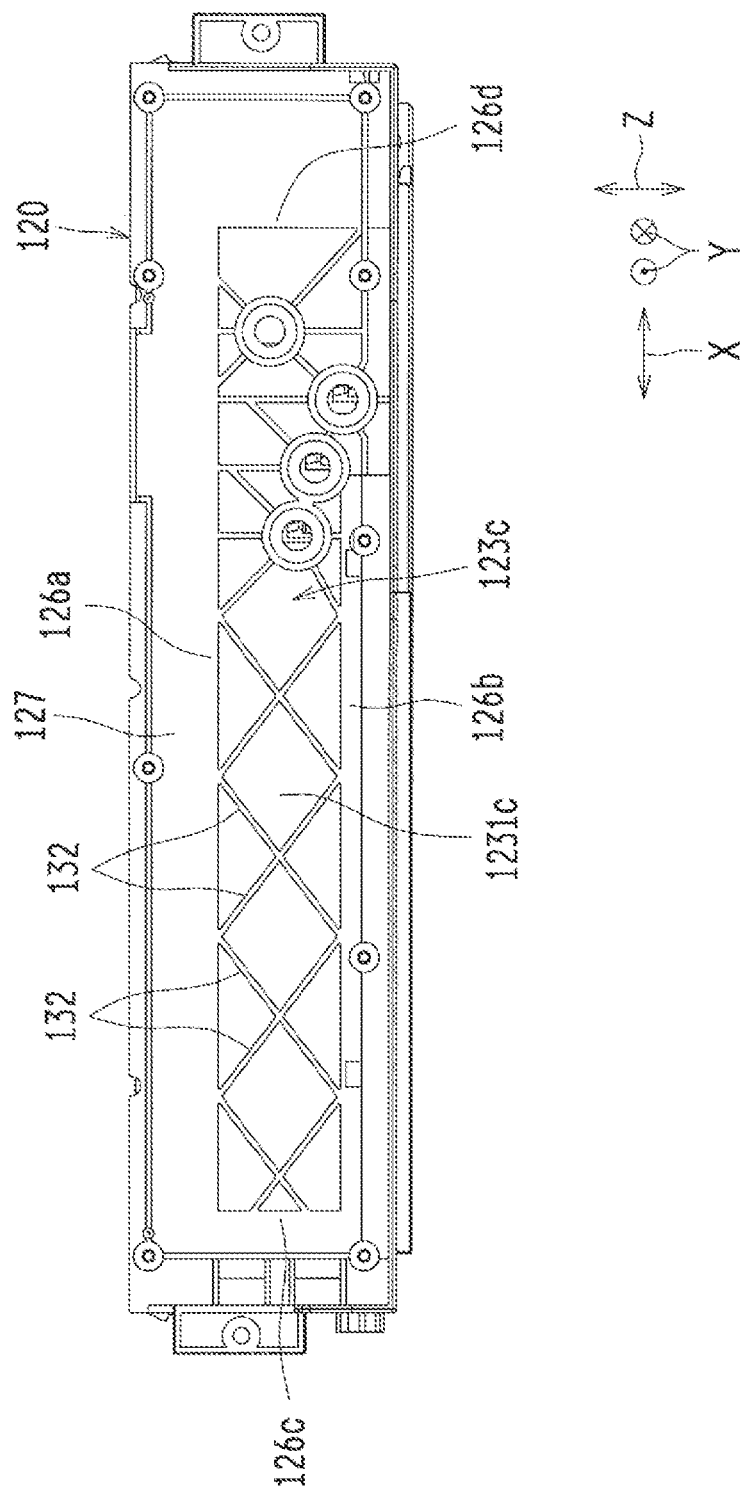
FIG. 8C is a left side view of the housing of the optical scanning device.
Figure 8D:
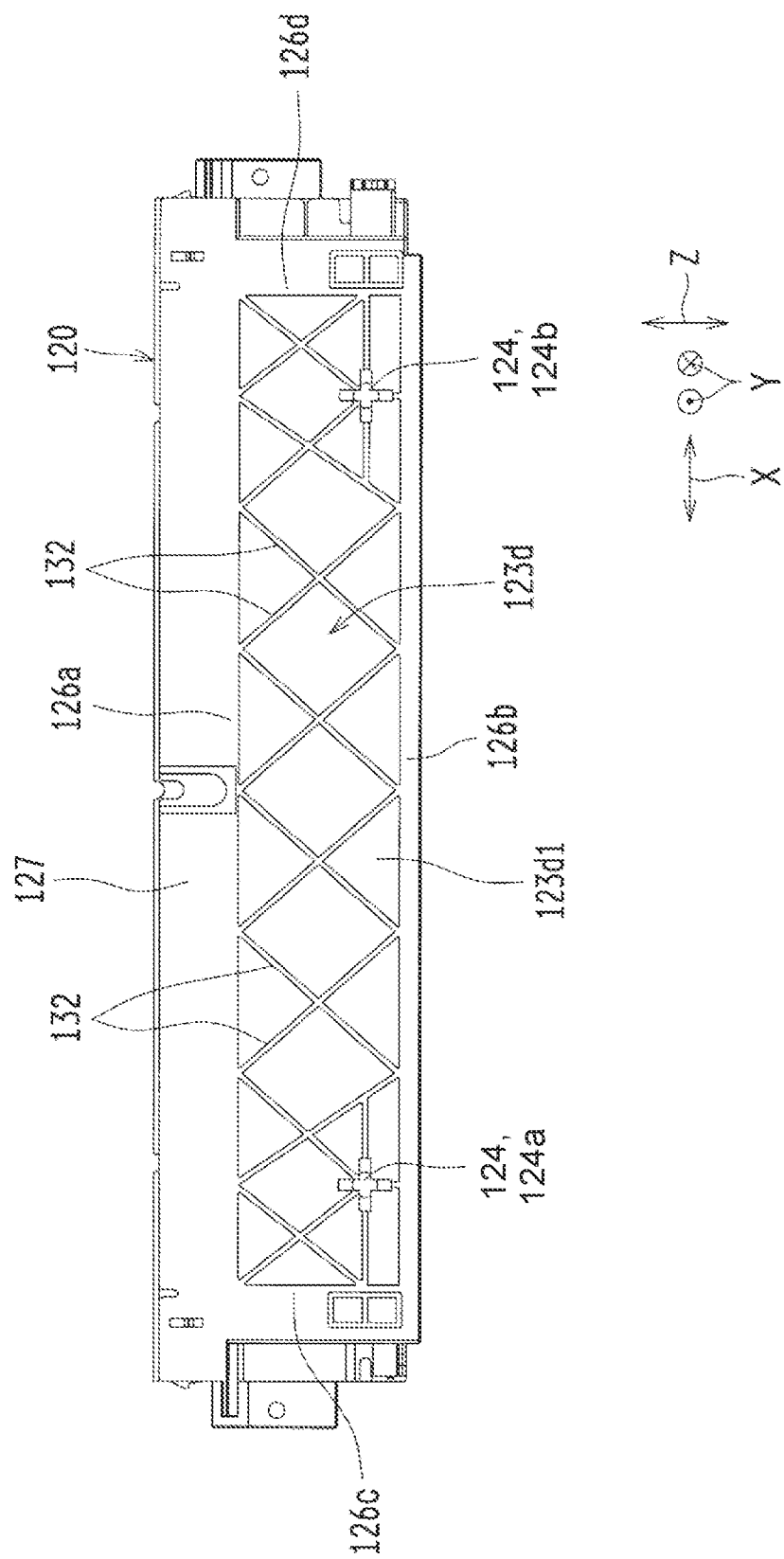
FIG. 8D is a right side view of the housing of the optical scanning device.

FIG. 2 is a schematic plan view of the optical scanning device 100 according to the present embodiment. FIG. 3 is a top front isometric view of the optical scanning device 100 with a top cover 121 thereof removed. FIG. 4 is a cross-sectional view of the optical scanning device 100 along line A-A shown in FIG. 3. FIG. 5 is a plan view of a housing 120 of the optical scanning device 100. FIG. 6A is an isometric view of the housing 120 of the optical scanning device 100. FIG. 6B is an isometric view of the housing 120 of the optical scanning device 100 with an fθ lens 170 provided therein. FIG. 6C is an isometric view of cross sections of the housing 120 and the fθ lens 170 shown in FIG. 6B. FIG. 6D is a cross-sectional view of a portion of the cross sections shown in FIG. 6C.

The optical scanning device 100 includes the top cover 121 having a rectangular shape (see FIG. 2) and the housing 120. The housing 120 is made from a resin material, and has a bottom plate 122 and four side walls 123a to 123d (see FIGS. 6A to 6D) surrounding the bottom plate 122. The side walls 123a to 123d are a front side wall, a back side wall, a left side wall, and a right side wall. The housing 120 is closed and protected from dust by the top cover 121. As illustrated in FIG. 2, the optical scanning device 100 guides light beams L-L emitted from a plurality of light emitting elements (semiconductor lasers) 151-151, which are light sources, to reflecting surfaces of a deflector 140 (polygon mirror), so that the light beams L-L are reflected and thus deflected by the reflecting surfaces of the deflector 140.

Each of the reflected light beams L-L is guided to a corresponding one of the photoreceptor drums 13-13, which are scan objects, by optical components provided in the housing 120. The optical scanning device 100 has a configuration in which each of the light beams L-L is scanned across the corresponding one of the photoreceptor drums 13-13.

Between the light emitting elements 151-151 and the deflector 140, four collimator lenses 152-152, four first mirrors 153a and 153b-153b, a cylindrical lens 154, and a second mirror 155 are disposed in the stated order from the light emitting elements 151-151 to the deflector 140.

The collimator lenses 152-152 transform the light beams L-L emitted from the light emitting elements 151-151 into parallel light. Three first mirrors 153b-153b reflect, toward one first mirror 153a, the light beams L-L respectively coming from three light emitting elements 151-151 through corresponding collimator lenses 152-152. The one first mirror 153a reflects, toward the cylindrical lens 154, the light beams L-L respectively reflected by the three first mirrors 153b-153b. The light beam L that has been emitted from the remaining one light emitting element 151 and that has passed through the corresponding collimator lens 152 travels above the first mirror 153a and enters the cylindrical lens 154. The cylindrical lens 154 converges the light beam L only in the sub-scanning direction and focuses the light beam L onto one of the reflecting surfaces of the deflector 140 via the second mirror 155.

The deflector 140 reflects the light beams L-L using the reflecting surfaces thereof, and thus deflects the light beans L-L repeatedly in the main scanning direction X while rotating at high speed around a rotation axis G.

As illustrated in FIG. 4, a plurality of reflection mirrors 161 to 168 are provided in the housing 120 of the optical scanning device 100 to guide the light beams L-L deflected by the deflector 140 to the respective photoreceptor drums 13-13. More specifically, along light paths from the deflector 140 to the photoreceptor drums 13-13, the common fθ lens 170, the plurality of reflection mirrors 161 to 168, and a plurality of (in the present example, four) fθ lenses 110-110 are disposed in the stated order from the deflector 140 to the photoreceptor drums 13-13.

The plurality of reflection mirrors 161 to 168 reflect the light beams L-L incident thereon toward the respective photoreceptor drums 13-13. As illustrated in FIG. 2, the top cover 121 has four dustproof windows 121a-121a that allow the reflected light beams L-L to pass therethrough. The dustproof windows 121a-121a are, for example, formed from transparent glass and configured to close openings in the top cover 121. The light beams L-L that have passed through the dustproof windows 121a-121a are imaged on the photoreceptor drums 13-13.

The fθ lens 170 is made from a resin material and extends in the main scanning direction X. The fθ lens 170 focuses and emits the light beams L-L so that the light beams L-L have a predetermined beam diameter on the surfaces of the respective photoreceptor drums 13-13. The fθ lens 170 also transforms, while the deflector 140 is deflecting the light beams L-L in the main scanning direction X at a uniform angular velocity, the light beams L-L so that the light beams L-L travel at a uniform linear velocity along main scanning lines on the respective photoreceptor drums 13-13. As a result, the light beams L-L are repeatedly scanned across the surfaces of the respective photoreceptor drums 13-13 in the main scanning direction X.

The plurality of reflection mirrors 161 to 168 provided along the light paths reflect the light beams L-L that have passed through the fθ lens 170 to cause the light beams L-L to respectively enter the plurality of fθ lenses 110-110. The plurality of fθ lenses 110-110 are made from a resin material and extend in the main scanning direction X. The plurality of fθ lenses 110-110 mainly focus the light beams L-L of the parallel light in the sub-scanning direction so that the light beams L-L have a predetermined beam diameter (spot diameter) on the surfaces of the respective photoreceptor drums 13-13, while also emitting the light beams L-L, which are now convergent light, to the respective photoreceptor drums 13-13 in the main scanning direction X.

In the optical scanning device 100 described above, the light beams L-L are reflected and deflected by the reflecting surfaces of the deflector 140, travel through the respective light paths to be incident on the respective photoreceptor drums 13-13, and are repeatedly scanned across the surfaces of the respective photoreceptor drums 13-13 for the main scan. The light beams L-L are scanned across the surfaces (circumferential surfaces) of the respective photoreceptor drums 13-13 as a result of the photoreceptor drums 13-13 being driven to rotate, and thus electrostatic latent images are formed on the surfaces of the respective photoreceptor drums 13-13.

EMBODIMENT OF PRESENT INVENTION

FIGS. 7A and 7B are cross-sectional views along line B-B and line C-C, respectively, shown in FIG. 5. FIGS. 8A to 8D are a front view, a back view, a left side view, and a right side view, respectively, of the housing 120 of the optical scanning device 100.

The optical scanning device 100 includes the housing 120 and the fθ lens 170. The housing 120 has the bottom plate 122, and the side walls 123a to 123d erected from a bottom surface 122a of the bottom plate 122 and surrounding the bottom surface 122a along a perimeter thereof. That is, the bottom surface 122a and the side walls 123a to 123d are substantially U-shaped in a cross-sectional view. The fθ lens 170 is accommodated in the housing 120.

One side wall (in the present example, the side wall 123d) of the side walls 123a to 123d has, on an outer surface 1231d thereof, one or more (in the present example two) positioners 124 (124a and 124b) that position the optical scanning device 100 relative to the image forming apparatus main body 11. Specifically, the positioners 124 (124a and 124b) position an optical scanning device main body 101 relative to the image forming apparatus main body 11. The bottom surface 122a has one or more first bottom surface ribs 131 (131a and 131b) extending from the positioners 124 toward the fθ lens 170 in an oblique direction with respect to the side wall 123d having the positioners 124 in a plan view.

According to the present embodiment, the first bottom surface ribs 131 on the bottom surface 122a of the housing 120 extend from the positioners 124 toward the fθ lens 170 in an oblique direction with respect to the side wall 123d having the positioners 124 in a plan view. This configuration allows for reinforcement of the housing 120. It is therefore possible to effectively prevent a decrease in the strength of the housing 120 and a resulting decrease in the accuracy of the optical components including the fθ lens 170 even if the basic thickness of the housing 120 is reduced.

The basic thickness, as referred to herein, may be the thickness of a main portion(s) (portion(s) having the largest area), which is specifically the bottom plate 122 and the side walls 123a to 123d. In the present example, the basic thickness is approximately 2.0 mm.

First Embodiment

According to a first embodiment, the one or more positioners 124 are a plurality of (in the present example, two) positioners 124a and 124b. The one or more first bottom surface ribs 131 are a plurality of first bottom surface ribs 131a and 131b respectively extending from the plurality of positioners 124a and 124b toward the fθ lens 170 in an oblique direction with respect to the side wall 123d having the positioners 124 in a plan view.

This configuration allows for further reinforcement of the housing 120 owing to the plurality of first bottom surface ribs 131a and 131b, making it possible to prevent a decrease in the strength of the housing 120 and a resulting decrease in the accuracy of the optical components including the fθ lens 170 more effectively.

Specifically, the positioners 124a and 124b are projections extending outward in the width direction Y from the outer surface 1231d of the side wall 123d. On the outer surface 1231d of the side wall 123d, the positioners 124a and 124b are arranged side by side with a space therebetween in the main scanning direction X and are in the same location in terms of the up-down direction Z (direction of the rotation axis G of the deflector 140). The positioners 124a and 124b are provided on opposite sides of the outer surface 1231d in the main scanning direction X. The first bottom surface ribs 131a and 131b are formed so that imaginary lines α (α1 and α2) (see FIG. 5) extending from the first bottom surface ribs 131a and 131b pass through the positioners 124a and 124b. The first bottom surface ribs 131a and 131b extend from the positioners 124a and 124a toward the middle in the main scanning direction X and toward the fθ lens 170.

Second Embodiment

According to a second embodiment, the first bottom surface ribs 131a and 131b extending from the plurality of (in the present example, two) positioners 124a and 124b intersect with each other.

This configuration allows for further reinforcement of the housing 120 owing to the first bottom surface ribs 131a and 131b extending from the plurality of positioners 124a and 124b and intersecting with each other, making it possible to prevent a decrease in the strength of the housing 120 and a resulting decrease in the accuracy of the optical components including the fθ lens 170 more effectively.

Third Embodiment

According to a third embodiment, the first bottom surface ribs 131 (131a and 131b) extend to ends (in the present example, opposite two side walls 123a and 123b) of the bottom surface 122a of the housing 120 in a direction (main scanning direction X) along the outer surface 1231d having the positioners 124 (124a and 124b).

This configuration allows for further reinforcement of the housing 120 owing to the first bottom surface ribs 131 (131a and 131b) extending to the ends of the bottom surface 122a of the housing 120, making it possible to prevent a decrease in the strength of the housing 120 and a resulting decrease in the accuracy of the optical components including the fθ lens 170 more effectively.

Fourth Embodiment

According to a fourth embodiment, the bottom surface 122a of the housing 120 has a protrusion 125 protruding from the bottom surface 122a. The fθ lens 170 is provided on an upper surface 125b of the protrusion 125. Specifically, the protrusion 125 is connected to the side wall 123c opposite to the side wall 123d having the positioners 124. The protrusion 125 forms a step having a height greater than a positioner side of the bottom surface 122a, which is a side having the positioners 124, by a predetermined height. Relative to the middle of the bottom surface 122a of the housing 120 in the width direction Y, the protrusion 125 is provided on an opposite side to the side having the positioners 124.

In a configuration in which the bottom surface 122a of the housing 120 has the protrusion 125, the protrusion 125 has a higher strength than the other portions of the housing 120 than the protrusion 125.

In the fourth embodiment, therefore, the first bottom surface ribs 131 (131a and 131b) are connected to a side surface 125a of the protrusion 125.

This configuration allows for further reinforcement of the housing 120 owing to the first bottom surface ribs 131 connected to the side surface 125a of the protrusion 125, making it possible to prevent a decrease in the strength of the housing 120 and a resulting decrease in the accuracy of the optical components including the fθ lens 170 more effectively.

In the fourth embodiment, the protrusion 125 is connected to the two side walls 123a and 123b opposed to each other in the direction (main scanning direction X) along the outer surface 1231d having the positioners 124.

This configuration allows for further reinforcement of the housing 120 owing to the first bottom surface ribs 131 connected to the side surface 125a of the protrusion 125, making it possible to prevent a decrease in the strength of the housing 120 and a resulting decrease in the accuracy of the optical components including the fθ lens 170 more effectively.

Fifth Embodiment

In order to further reinforce the housing 120 in a configuration in which the bottom surface 122a does not have the protrusion 125, preferably, each first bottom surface rib 131 (131a and 131b) extends to a corner area ß(ßa and ßb) (see FIG. 5) of the housing 120 that is diagonally opposite to where the first bottom surface rib 131 extends from in a plan view.

According to a fifth embodiment, by contrast, the bottom surface 122a of the housing 120 has the protrusion 125, and therefore the first bottom surface ribs 131 (131a and 131b) extend to corner areas γ (γa and γb) (see FIG. 5) between the protrusion 125 and the side walls (123a and 123b) in a plan view. Specifically, each first bottom surface rib 131 extends to the corner area γ (γa and γb) that is diagonally opposite to where the first bottom surface rib 131 extends from. In the present example, the side walls forming the corner areas γ (γa and γb) are the two side walls 123a and 123b opposed to each other in the direction (main scanning direction X) along the outer surface 1231d of the housing 120.

This configuration allows for further reinforcement of the housing 120 owing to the first bottom surface ribs 131 (131a and 131b) extending to the corner areas γ (γa and γb) between the protrusion 125 and the side walls (123a and 123b) in a plan view, making it possible to prevent a decrease in the strength of the housing 120 and a resulting decrease in the accuracy of the optical components including the fθ lens 170 more effectively.

Sixth Embodiment

According to a sixth embodiment, the housing 120 has outer perimeter walls 126a to 126d projected outward from outer surfaces 1231a to 1231d of the side walls 123a to 123d and surrounding the outer surfaces 1231a to 1231d. The outer perimeter wall 126a, which is a top outer perimeter wall among the outer perimeter walls 126a to 126d in an erection direction (up-down direction Z) of the side walls 123a to 123d erected from the bottom surface 122a of the housing 120, has an erected wall 127 erected in the erection direction. That is, the outer surfaces 1231a to 1231d and the outer perimeter walls 126a to 126d are substantially U-shaped in a cross-sectional view.

The strength of the side walls 123a to 123d can be increased by providing the side walls 123a to 123d with the outer perimeter walls 126a to 126d projected from the outer surfaces 1231a to 1231d thereof and providing the outer perimeter wall 126a, which is a top outer perimeter wall in the erection direction (up-down direction Z) of the side walls 123a to 123d erected from the bottom surface 122a, with the erected wall 127 erected therefrom in the erection direction.

In the present example, the erected wall 127 is erected from a peripheral edge 126a1 of the outer perimeter wall 126a. This configuration allows for a further increased strength of the side walls 123a to 123d. It is therefore possible to prevent a decrease in the strength of the housing 120 and a resulting decrease in the accuracy of the optical components including the fθ lens 170 more effectively.

Seventh Embodiment

According to a seventh embodiment, a plurality of outer side surface ribs 132-132 intersecting with each other are provided within the outer perimeter walls 126a to 126d on at least one (in the present example, all) of the side walls 123a to 123d surrounding the bottom surface 122a along the perimeter thereof. The plurality of outer side surface ribs 132-132 are at an angle to the outer perimeter walls 126a to 126d.

This configuration allows for a further increased strength of the side walls (123a to 123d) owing to the plurality of outer side surface ribs 132-132 intersecting with each other that are provided within the outer perimeter walls 126a to 126d. It is therefore possible to prevent a decrease in the strength of the housing 120 and a resulting decrease in the accuracy of the optical components including the fθ lens 170 more effectively.

In the present example, the outer side surface ribs 132-132 are connected to the outer perimeter walls 126a to 126d. Opposite ends of each of the reflection mirrors 162, 165, 167, and 168 in the main scanning direction X protrude into the two side walls 123a and 123b (see FIGS. 8A and 8B) opposed to each other in the main scanning direction X within the outer perimeter walls 126a to 126d. Accordingly, the outer surfaces 1231a and 1231b of the side walls 123a and 123b have frame walls 128-128, which are square in a plan view, for securing the opposite ends of each of the reflection mirrors 162, 165, 167, and 168 in the main scanning direction X. The outer side surface ribs 132-132 on the side walls 123a and 123b are also connected to the frame walls 128-128.

Eighth Embodiment

According to an eighth embodiment, the optical scanning device 100 includes the plurality of fθ lenses 110-110 located downstream of the fθ lens 170 in a traveling direction of the light beams L. The bottom surface 122a has one or more second bottom surface ribs 133. The second bottom surface ribs 133 extend along the outer surface 1231d having the positioners 124 (124a and 124b), between adjacent fθ lenses 110 and 110 among the plurality of fθ lenses 110-110, and are connected to the two side walls 123a and 123b opposed to each other in the direction (main scanning direction X) along the outer surface 1231d.

This configuration allows the second bottom surface ribs 133 to be connected to the opposite two side walls 123a and 123b. This configuration therefore allows for further reinforcement of the housing 120, making it possible to prevent a decrease in the strength of the housing 120 and a resulting decrease in the accuracy of the optical components including the plurality of fθ lenses 110-110 more effectively.

The eighth embodiment further includes a third bottom surface rib 134 (see FIGS. 5 and 6A to 6D) extending in the width direction Y in the middle in the direction (main scanning direction X) along the outer surface 1231d having the positioners 124.

The angle of the first bottom surface ribs 131 to the side wall 123d and the angle of the outer side surface ribs 132 to the outer perimeter wall 126a may be, for example, approximately 30° to 60°, but are not limited thereto. Preferably, the first bottom surface ribs 131, the second bottom surface ribs 133, and the third bottom surface rib 134 are as high as possible to the extent that the ribs do not interfere with the light beams L. Preferably, the heights thereof may be, for example, approximately 10 mm to 20 mm, but are not limited thereto. More preferably, the heights thereof may be approximately 15 mm to 20 mm, but are not limited thereto. Preferably, the outer side surface ribs 132 are as high as possible to the extent that the ribs do not cause upsizing of the configuration of the device. Preferably, the heights thereof may be, for example, approximately 10 mm to 20 mm, but are not limited thereto. More preferably, the heights thereof may be approximately 15 mm to 20 mm, but are not limited thereto. The thicknesses of the first bottom surface ribs 131, the outer side surface ribs 132, the second bottom surface ribs 133, and the third bottom surface rib 134 may be, for example, less than or equal to the basic thickness (for example, 2 mm). For example, the thicknesses may be in a range of from approximately ¾ of the basic thickness (1.5 mm) to the basic thickness (2 mm), but are not limited thereto. Note that in a housing in a conventional configuration, the height of the bottom surface ribs is less than 10 mm, and may be, for example, approximately 4 mm to 5 mm.

In the present example, the second bottom surface ribs 133 are higher than the first bottom surface ribs 131 and the third bottom surface rib 134.

In the eighth embodiment, the upper surface 125b of the protrusion 125 has a plurality of fourth bottom surface ribs 135-135 (see FIGS. 5 and 6A to 6D) extending along the side walls (123a to 123d). The upper surface 125b of the protrusion 125 also has a plurality of fifth bottom surface ribs 136-136 (see FIGS. 5 and 6A to 6D) at an angle to the side walls (123a to 123d).

OTHER EMBODIMENTS

Although the foregoing embodiments include a plurality of positioners 124 provided on the side wall 123d, an alternative embodiment may include only one positioner 124. In this case, the positioner 124 extends from the positioner 124 toward the fθ lens 170 in an oblique direction with respect to the side wall 123d in a plan view.

Strength Analysis Simulation

The following describes a strength analysis simulation conducted for the housing 120 according to an embodiment of the present invention and a housing in a conventional configuration.

In the strength analysis simulation, a predetermined constant pressure was applied to a housing in a conventional configuration having a basic thickness of 2.5 mm, a housing in a conventional configuration having a basic thickness of 2.0 mm, and the housing 120 according to the embodiment of the present invention having a basic thickness of 2.0 mm to cause deformation of the housings and measure the maximum deformation thereof. The housing having a basic thickness of 2.5 mm resulted in a maximum deformation of 1.4 mm. The housing having a basic thickness of 2.0 mm for cost reduction resulted in a maximum deformation of 2.8 mm, demonstrating a significant decrease in the strength.

By contrast, the housing 120 according to the embodiment of the present invention having a basic thickness of 2.0 mm resulted in a maximum deformation of 1.6 mm, demonstrating the ability of maintaining the strength comparable to that of the housing in a conventional configuration having a basic thickness of 2.5 mm.

The present invention is not limited to the embodiments described above and may be embodied in other specific forms. Therefore, such embodiments are merely examples in all respects and should not be construed as limiting. The scope of the present invention is indicated by the claims, and is not limited to the foregoing description. All modifications and variations that come within the equivalent scope of the claims are within the scope of the present invention.

What is claimed is:

1. An optical scanning device comprising:
    a housing having a bottom surface, and side walls erected from the bottom surface and surrounding the bottom surface along a perimeter of the bottom surface; and
    an fθ lens accommodated in the housing, wherein
    one side wall of the side walls has, on an outer surface of the one side wall, a plurality of positioners that positions the optical scanning device relative to a main body of an image forming apparatus,
    the bottom surface has a plurality of first bottom surface ribs respectively extending from the plurality of positioners toward the fθ lens in an oblique direction with respect to the one side wall having the plurality of positioners in a plan view, and
    the plurality of first bottom surface ribs respectively extending from the plurality of positioners intersects with each other.

2. The optical scanning device according to claim 1, wherein
    the plurality of first bottom surface ribs extends to ends of the bottom surface of the housing in a direction along the outer surface having the plurality of positioners.

3. The optical scanning device according to claim 1, further comprising
    a plurality of second fθ lenses located downstream of the fθ lens in a traveling direction of light beams, wherein
    the bottom surface has one or more second bottom surface ribs extending along the outer surface having the plurality of positioners, between adjacent second fθ lenses among the plurality of second fθ lenses, and being connected to two of the side walls opposite each other in a direction along the outer surface having the plurality of positioners.

4. An image forming apparatus comprising the optical scanning device according to claim 1.

5. An optical scanning device comprising:
    a housing having a bottom surface, and side walls erected from the bottom surface and surrounding the bottom surface along a perimeter of the bottom surface; and
    an fθ lens accommodated in the housing, wherein
    one side wall of the side walls has, on an outer surface of the one side wall, one or more positioners that position the optical scanning device relative to a main body of an image forming apparatus,
    the bottom surface has one or more first bottom surface ribs extending from the one or more positioners toward the fθ lens in an oblique direction with respect to the one side wall having the one or more positioners in a plan view,
    the bottom surface of the housing has a protrusion protruding from the bottom surface,
    the fθ lens is provided on an upper surface of the protrusion, and
    the one or more first bottom surface ribs are connected to a side surface of the protrusion.

6. The optical scanning device according to claim 5, wherein
    the protrusion is connected to two of the side walls opposite each other in a direction along the outer surface having the one or more positioners.

7. The optical scanning device according to claim 5, wherein
    the one or more first bottom surface ribs extend to corner areas between the protrusion and the side walls in the plan view.

8. The optical scanning device according to claim 5, wherein
    the one or more positioners comprise a plurality of positioners, and the one or more first bottom surface ribs comprise a plurality of first bottom surface ribs respectively extending from the plurality of positioners toward the fθ lens in the oblique direction with respect to the side wall having the plurality of positioners in the plan view.

9. The optical scanning device according to claim 8, wherein
    the plurality of first bottom surface ribs respectively extending from the plurality of positioners intersects with each other.

10. The optical scanning device according to claim 5, wherein
    the one or more first bottom surface ribs extend to ends of the bottom surface of the housing in a direction along the outer surface having the one or more positioners.

11. An image forming apparatus comprising the optical scanning device according to claim 5.

12. An optical scanning device comprising:
    A housing having a bottom surface, and side walls erected from the bottom surface and surrounding the bottom surface along a perimeter of the bottom surface; and
    an fθ lens accommodated in the housing, wherein one side wall of the side walls has, on an outer surface of the one side wall, one or more positioners that position the optical scanning device relative to a main body of an image forming apparatus,
    the bottom surface has one or more first bottom surface ribs extending from the one or more positioners toward the fθ lens in an oblique direction with respect to the one side wall having the one or more positioners in a plan view,
    the housing has outer perimeter walls projected outward from outer surfaces of the side walls and surrounding the outer surfaces, and
    a top outer perimeter wall of the outer perimeter walls, in an erection direction of the side walls erected from the bottom surface of the housing, has an erected wall erected in the erection direction.

13. The optical scanning device according to claim 12, wherein
    a plurality of outer side surface ribs intersecting with each other is provided within the outer perimeter walls.

14. The optical scanning device according to claim 12, wherein
    the one or more positioners comprise a plurality of positioners, and the one or more first bottom surface ribs comprise a plurality of first bottom surface ribs respectively extending from the plurality of positioners toward the fθ lens in the oblique direction with respect to the side wall having the plurality of positioners in the plan view.

15. The optical scanning device according to claim 14, wherein
    the plurality of first bottom surface ribs respectively extending from the plurality of positioners intersects with each other.

16. The optical scanning device according to claim 12, wherein
the one or more first bottom surface ribs extend to ends of the bottom surface of the housing in a direction along the outer surface having the one or more positioners.

17. An image forming apparatus comprising the optical scanning device according to claim 12.

* * * * *